United States Patent [19]

Siefken

[11] 4,167,617
[45] Sep. 11, 1979

[54] RAPIDLY CURABLE SILOXANE COMPOSITION

[75] Inventor: Mark W. Siefken, Woodbury, Minn.

[73] Assignee: Minnesota Mining and Manufacturing Company, St. Paul, Minn.

[21] Appl. No.: 866,351

[22] Filed: Jan. 3, 1978

Related U.S. Application Data

[63] Continuation of Ser. No. 659,526, Feb. 19, 1976, abandoned, which is a continuation-in-part of Ser. No. 556,495, Mar. 7, 1975, Pat. No. 4,020,043.

[51] Int. Cl.$^2$ .............................................. C08G 77/06
[52] U.S. Cl. ................................ 528/23; 204/159.13; 260/348.41; 526/279; 526/225
[58] Field of Search ............ 260/2 S, 46.5 R, 46.5 G, 260/348.41; 204/159.13; 526/279, 225; 528/23

[56] References Cited

U.S. PATENT DOCUMENTS

| | | | |
|---|---|---|---|
| 4,020,043 | 4/1977 | Siefken | 260/46.5 R |
| 4,043,967 | 8/1977 | Berg | 528/23 |
| 4,049,861 | 9/1977 | Nozari | 260/46.5 R |

FOREIGN PATENT DOCUMENTS 2345923  3/1975  Fed. Rep. of Germany.

*Primary Examiner*—Melvyn I. Marquis
*Attorney, Agent, or Firm*—Cruzan Alexander; Donald M. Sell; Mark A. Litman

[57] ABSTRACT

A method of curing at least one silane containing a labile group in the presence of a highly fluorinated aliphatic sulfonyl catalyst.

10 Claims, No Drawings

RAPIDLY CURABLE SILOXANE COMPOSITION

This application is a continuation of U.S. Application Ser. No. 659,526, filed Feb. 19, 1976, now abandoned, which is in turn a continuation-in-part of U.S. Application Ser. No. 556,495, filed Mar. 7, 1975, now U.S. Pat. No. 4,020,043.

There are many different types of silicone containing compounds which are known to be polymerizable. Those materials which are polymerizable into molecular chains of greater size than that of two monomers (i.e. a dimer) require at least two labile groups, groups that can split off during a polymerization reaction. This allows the residue of the monomer (the monomer or reactant less the labile group) to react through the reactive site formed by the elimination of the labile group, to another reactive site on another monomer. With only two such labile groups on the monomers, essentially linear polymer chains will be formed in the polymer product unless additional, three-dimensional reactants (crosslinking agents) are added to the reaction mixture. With three or more labile groups on the silicone atom or with monomers having two terminal silicone atoms with at least three labile groups between them, crosslinking can occur.

A typical polymerization reaction of a silicone containing monomer would be that of dichlorodimethylsilane in an aqueous phase. Hydrogen chloride evolves, chlorine being released from the monomer and hydrogen being removed from the water. This can readily be seen by the drop in pH of the solution and the odor of hydrochloric acid. A second phase will develop in the solution, a light, colorless oil comprising a mixture of linear and cyclic poly(dimethylsiloxanes) of empirical composition:

[(CH$_3$)$_2$SiO]$_n$ where n is an integer greater than 2. In this simple reaction, n can be equal to several hundred.

Various techniques are known for controlling the hydrolysis reaction. In order to increase the proportion of low molecular weight molecules, a cosolvent for organochlorosilanes and water can be used. Reduced temperatures and hydrolysis in the presence of water-immiscible, non-polar solvents minimizes the formation of polysiloxanes. Strong acids favors the formation of low molecular weight cyclic polymer units. Silanols are stabilized in nearly neutral solutions and preferentially condense to siloxanes in the presence of strong bases.

In general, it is known that silicone materials of the general formula:

X$_m$SiR$_{4-m}$ wherein
X is a labile group,
R is a hydrocarbyl group and
m is an integer 2, 3 or 4,
are polymerizable by various techniques. By labile group is meant any hydrolyzable group and hydrogen. A hydrocarbyl group is a moiety connected through a carbon atom to the silicon.

Exemplary labile groups, X, are alkoxy, aryloxy, acyloxy, halogen and hydrogen. These groups may contain heteroatoms and may be linear, branched or cyclic as long as the group is hydrolyzable.

The term hydrocarbyl is intended to include groups resulting from the removal of hydrogen from the carbon atom of a hydrocarbon and from hydrocarbons containing one or more heteroatoms selected from oxygen, sulfur and nitrogen. Exemplary hydrocarbyl groups include aromatic groups containing one to ten carbons (e.g., phenyl, naphthyl, and benzothienyl) and aliphatic groups containing 1 to 18 carbon atoms. The aliphatic groups may be linear, branched or cyclic (e.g. methyl, ethyl, isopropyl, propyl, cyclohexyl, octyl, sodocyl, octadecyl, ethoxyethyl, ethoxyethoxyethyl, thiocthoxyethyl, tetrahydrofuryl, tetrahydrothienyl, dioxanyl, peperidyl, pyrolidinyl, etc. The hydrocarbyl group may be substituted by functional or non-functional groups such as halogen, alkoxy, epoxy, phenoxy, cyano, vinyl, allyl, acryloxy, and the like.

Exemplary classes of compounds falling within the general formula are silanes, silanols, siloxanes, alkoxy silanes, aryloxysilanes, acyloxysilanes, haloalkylsilanes, haloarylsilanes, etc. It is generally well known that almost any conceivable functional group can be introduced into the side chain of an alkyl or aryl-substituted silane, so that a detailed description of operational substituents is unnecessary.

Specific compounds falling into the broad class of polymerizable silicone materials are, for example:

(CH$_3$)$_3$SiOCH$_3$
CH$_3$Si(OCH$_3$)$_3$
CH$_3$Si(OC$_6$H$_{13}$)$_3$
(CH$_3$)$_2$Si(OC$_2$H$_5$)CH=CH$_2$

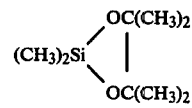

NH$_2$(CH$_2$)$_3$Si(OC$_2$H$_5$)$_3$
CH$_3$Si(C$_6$H$_5$) (OC$_2$H$_5$)$_2$
HC(CH$_2$)$_3$Si(OCH$_3$)$_3$
(NC$_5$H$_4$)SiCH$_3$(OC$_2$H$_5$)$_2$
H$_2$C=C(CH$_2$)COO(CH$_2$)$_3$SiCH$_3$(OH$_c$)$_2$
H$_3$C—CH$_2$—O—CH$_2$—CH$_2$—SiCH$_3$(OC$_2$H$_5$)$_2$
Si(OCH$_3$)$_4$
(CH$_2$=CH—CH$_2$)$_2$Si(OCH$_3$)$_2$

It is also known that polymers having at least one labile-group-substituted-silyl group, SiX$_m$, may be cured by various techniques.

Exemplary curable silyl-substituted polymers are the silicone terminated polyurethanes described in U.S. Pat. No. 3,632,557.

Specific examples of a silyl-substituted polymer have the structures:

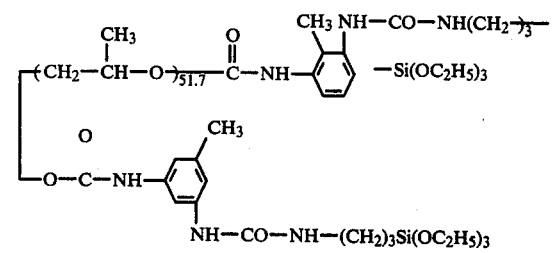

-continued

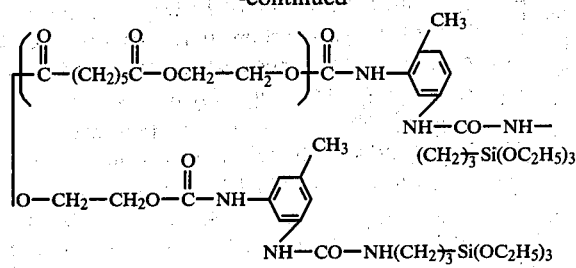

This invention relates to the use of a novel class of catalyst for use in polymerization of a silicone material.

Specifically this invention relates to the use of highly fluorinated aliphatic sulfonylic and sulfonic catalysts for the polymerization of silicone materials.

The sulfonic materials are defined as a highly fluorinated aliphatic sulfonic acid or salt thereof. The sulfonylic materials are defined as a compound containing two highly fluorinated aliphatic sulfonyl groups attached directly to an imide or methylene e.g., —NR'— or CR'R". The sulfonic materials may be partially represented by the formula $(R_fSO_3)_nR$ wherein R is selected from hydrogen, ammonium cation and metal cation and n is the valence of R. The sulfonylic catalysts may be partially represented by the formula $(R_fSO_2)-Q-(SO_2R_f')$ wherein Q is a divalent radical selected from —NR', —CR'R" and —C=CHR$^3$ wherein
R" is selected from hydrogen, chlorine, bromine, iodine, R$_f$SO$_2$, alkenyl of 3 to 4 carbon atoms, alkyl of 1 to 20 carbon atoms (preferably 1 to 4), aryl of up to 20 carbon atoms (preferably 1 to 10), and alkaryl of up to 20 carbon atoms (preferably 7 to 10),
R$^3$ is H, alkenyl of 3 to 3 carbons and aryl of up to 20 carbons, and
R' is selected from hydrogen, chlorine, bromine, iodine, ammonium cations or metal cations.

The catalysts wherein the N or C atom bonded to the highly fluorinated aliphatic (preferably alkyl) group has a hydrogen atom bonded thereto are active catalysts. Those having no hydrogen atom are latent and may be activated by heat, acid, chelating agent or combinations thereof as later exemplified.

Metals useful in the above definitions essentially includes all metals. All metals inclusive of and to the left of aluminum, germanium, antimony and polonium on the periodic chart of the elements, and the rare earth metals can function in the practice of this invention. The group Ia and IIa metals must be activated by acids and heat or chelating agents and heat, but they are functional. Examples of many metals, including lanthanum, are provided to show that all metals will work, even though some would be commercially useless because of expense. Preferably the metals would exclude elements 59–63, 65–71, and those above 89.

According to the Periodic Table in *Advanced Organic Chemistry*, Cotton and Wilkinson, 2d. Ed., Interscience publishers, 1966, more preferred metals would be those of Groups, Ia, IIa, VIa, VIII, Ib, IIb, IVb, and Vb and lanthanum, titanium, zirconium, chromium, molybdenum, manganese, cesium, and gadolinium based on economic considerations.

In the practice of this invention, R$_f$ and R$_f'$ are independently defined by highly fluorinated aliphatic radical which encompasses fluorinated, saturated, monovalent, aliphatic radicals having 1 to 20 carbon atoms. The skeletal chain of the radical may be straight, branched or, if sufficiently large (e.g. at least 3 or 5 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has a formula $C_xF_{2x+1}$ wherein x has a value from 1 to 18.

The preferred active catalysts of this invention are those compounds having the formula $(R_fSO_2)Q(O_2SR_f')$ wherein
R$_f$ and R$_f'$ are independently a highly fluorinated alkyl group, and
Q is a divalent radical selected from —NH— and —CHR—
wherein R is selected from Br, Cl, I, H, alkyl groups of 1 to 20 carbon atoms, alkenyl of 3 to 4 carbon atoms, aryl or aralkyl of up to 20 carbon atoms, or R'X,
wherein R' is an alkylene group of up to 20 carbon atoms and X is H, Br, Cl, I, —O$_2$SR$_f$, —CH(O$_2$SR$_f$)$_2$, —CH—(CH$_2$)$_n$—COOR$^4$,
 |
 Br or —CY(COOR$^2$)$_2$
wherein R$^4$ is H or 1 to 8 alkyl and n is 0 to 8, and
wherein R$^2$ is alkyl of 1 to 4 carbon atoms or phenylalkyl, the alkyl group of which has 1 to 4 carbon atoms, and Y is H, Br, Cl, I, or NO$_2$.

These catalyst compounds are known in the art, although not for the cure of epoxy-terminated silanes into abrasion resistant coatings. Prior art disclosure of the sulfonic acids, sulfonylic acids and their derivatives is disclosed in such materials as U.S. Pat. Nos. 3,586,616; 3,632,843; 3,704,311; 3,758,531; 3,758,591; 3,758,592; 3,758,593; 3,776,960; 3,794,687; 3,842,019; 3,932,526; German D.S. No. 2,239,817; and U.S. Application Ser. No. 556,494 filed Mar. 7, 1975 now U.S. Pat. No. 4,054,596 in the name of Kosher and Barber and Ser.

No. 581,101 filed June 9, 1975 now U.S. Pat. No. 3,976,053 in the name of Kosher.

The curable compositions of this invention can be modified by incorporating therein any number of conventional fillers, e.g., reinforcing fillers such as finely divided silica, non-reinforcing fillers such as coarse silicas, diatomaceous earth, metallic oxides such as titania, ferric oxide, zinc oxide, talc and the like, and fibrous fillers such as asbestos or glass fibers or filaments. The fillers are added in proportions up to about 200 percent by weight of the curable composition, preferably up to about 50 percent.

The vulcanizable compositions of the invention may also contain modifiers such as resinous siloxane modifiers, plasticizers, pigments, UV stabilizers, oxidation inhibitors, and dielectric substances such as graphite or carbon black.

EXAMPLES

Example 1

To 100 parts of dimethyldimethoxysilane was added 1 part of bis (trifluoromethylsulfonyl)methane. The mixture was stirred to disperse the catalyst and allowed to stand at room temperature (24° C.). After 24 hours (no further change occurred in 4 days) a viscous material (viscosity greater than about 1,000,000 centipoise) was obtained.

Similar results were obtained when either bis(perfluorobutylsulfonyl)methane, bis(trifluoromethylsulfonyl)imide, trifuloromethylsulfonic acid or methyl 4,4-bis(trifluoromethylsulfonyl)-2-carboxy-2-bromobutanoate was used in place of bis(trifluoromethylsulfonyl methane.

When 5 percent by weight of tetramethylsilicate and 2 percent by weight of tin octoate is added to the above-described viscous fluids, the mixture cures to a rubbery product having good tensile strength and elongation.

When the above experiments were repeated using various amounts of catalyst, it was found that similar results were obtained when from about 0.05% to more than 5% by weight of catalyst was used.

Example 2

Into 100 parts of vinyltriethoxysilane was mixed 1 part of bis(trifluoromethylsulfonyl)methane and the mixture was coated onto polyethyleneterephthalate. In one day a coherent film had formed which could be stripped from the substrate as a self-supporting film was obtained. When the mixture was coated onto polyethyleneterephthalate primed with polyvinylidenechloride, a tenatiously adherent film was obtained that had water repellent characteristics.

When the example was repeated using as catalyst 1 part of trifluoromethylsulfonic acid, the coated mixture cured in about 4 hours.

Similar results were obtained with other highly fluorinated alkylsulfonyl protonic acids.

Example 3

Example 2 was repeated using 3(methacryloloxy) propyltrimethoxysilane in place of vinyl triethoxysilane. In one day a tacky film was obtained (it did not change on standing an additional 3 days). On exposure to the radiation of a Hanovia lamp for 2 minutes an adhesive film was formed which performs as an excellent adhesive for polymethylmethacrylate.

Example 4

Example 2 was repeated using vinyl triacetoxysilane. In one day (no further change in 4 days) a friable brittle film was formed when 1% bis(trifluoromethylsulfonyl) methane was used as catalyst. When 1% trifluoromethylsulfonic acid was used as catalyst, a friable film was obtained in 4 days. The film had water repellant properties.

Example 5

Example 2 was repeated using perfluoroisopropoxypropyltriacetoxysilane in place of vinyltriethoxysilane. A tenatious highly water repellent film was formed.

Example 6

Example 2 was repeated using phenyltriethoxysilane in place of vinyltriethoxysilane. A friable film was obtained for coatings of about 25 microns in one day and in 4 days for coatings 100 microns thick. Similar results were obtained when each of bis(trifluoromethylsulfonyl)methane and trifluoromethylsulfonic acid were used as catalyst.

Example 7

Example 1 was repeated using in place of 100 parts of dimethyldimethoxysilane a mixture of 90 parts of dimethyldimethoxysilane and 10 parts of vinyltriethoxy silane and 1 part of bis(trifluoromethylfulsonyl)methane as catalyst. A viscous gum-like material (viscosity greater than 1,000,000 centipoise) was obtained. Similar viscous material was obtained when trifluoromethylsulfonic acid was used as catalyst.

Two percent by weight of lauroyl peroxide and 10 percent by weight of calcined magnesium oxide was added to the material and the mixture milled on a rubber mill for about 10 minutes. The mixture was sheeted from the mill and heated at about 1 hour. There was obtained a rubbery product having good tensile strength and elongation.

Example 8

A trialkoxysilyl-endcapped polymer was prepared from polyoxypropylene glycol (molecular weight of 3000), toluene diisocyanate, and γ-aminopropyltriethoxysilane was added thereto. To 100 parts of this polymer was added 1 part of bis(trifluoromethylsulfonyl)methane in 15 ml. of methylene chloride while stirring vigorously. In 1 to 2 hours the mixture had cured to a tough rubbery product.

Examples 9–20

The following group of examples demonstrate the generic utility of catalysts according to the present invention in curing of silane monomers.

To 10.0 g portions of $Si(OCH_2CH_3)_4$ was added 0.5 g of the following catalysts:

9. $(CF_3SO_2)_2CH_2$
10. $(CF_3SO_2)_2CHC_6H_5$
11. $(CF_3SO_2)_2CHCl$
12. $(CF_3SO_2)_2CHBr$
13. $(CF_3SO_2)_2CHCH_2CH(CF_3SO_2)_2$

14. $(CF_3SO_2)_2CHCH_2\underset{\underset{Br}{|}}{C}(CO_2C_2H_5)_2$

15. $(CF_3SO_2)_2CHCH_2\underset{\underset{NO_2}{|}}{C}(CO_2C_2H_5)_2$

16. $C_4F_9SO_2\underset{\underset{H}{|}}{N'}CF_3SO_2$

17. $(CF_3SO_2)_2CHCH_2\underset{\underset{Br}{|}}{C}HCH_2CH_2Cl$

18. $(C_4F_9SO_2)_2CHC_6H_5$
19. $(C_4F_9SO_2)_2CH_2$
20. $(C_4F_9SO_2)_2CHBr$

In all cases the examples were left in the air for 24 hours. Hard crystal-like, tack free particles resulted.

Examples 21-40

To 1.0 g each of the following silanes, 0.05 g of the catalysts of Examples 9, 10, 12, 14 and 19 were added:
21-25. $H_2C=C(CH_3)COO(CH_2)_3Si(OCH_3)_3$
26-30. $(CF_3)_2CFO(CH_2)_3Si(OCH_2CH_3)_3$ 31-35. 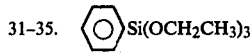Si(OCH$_2$CH$_3$)$_3$ 36-40. $CH_3Si(OCH_2CH_3)_3$ In all cases the silanes cured due to the activity of the catalyst.

Example 41

A precondensate of 3(2,3-epoxy)propxydiethoxysilane was prepared by mixing a flask set for distillation, 16.5 g. 3(2,3-epoxy)propoxytrimethoxysilane in 16.5 g. ethanol, 8.0 g. water in 8 g. ethanol, and 1 drop of 0.1N HCl. The flask was heated to distill off volatiles to a pot temperature of 80° C., the residue cooled and diluted to a 60% precondensate with methanol. To 10 g. of this precondensate was added 0.2 g. of trifluoromethyl sulfonic acid. The precondensate was substantially fully polymerized after 16 hours at room temperature.

Examples 42-44

To 10 g portions of the precondensate of the previous example (diluted to 40% in ethyl acetate) was added 1 molar percent of the catalysts a. $(CF_3SO_2)_2CHCH_2\underset{\underset{Br}{|}}{C}HCH_2CH$ b. 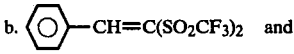 and c. $[(CF_3SO_2)_2CH]_2CH_2$.

The compositions were cured in 30 minutes at 90° C.

Examples 45-52

To 100 g portions of the precondensate of the previous example (40% in ethyl acetate) was added 5 molar percent portions of the catalysts:
a. $La[(CF_3SO_2)_2CH]_3$
b. $Ni[(CF_3SO_2)_2CH]_2$
c. $Zn[(CF_3SO_2)_2CH]_2$ d. $Pb[(CF_3SO_2)_2CH]_2$
e. $Mn[(CH_3SO_2)_2CH]_2$
f. $Ag(CF_3SO_2)_2CBr$
g. $C_4F_9SO_2-N-SO_2CF_3$ g. 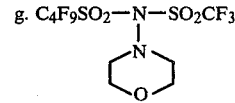

h. $NH_4(CF_3SO_2)_2CBr$, and
i. $Pb(SO_2CF_3)_2$.

In each case, sure was effected by heating at 90° C. for 60 minutes and 120° C. for 30 minutes. The heat was sufficient to delatentize the catalyst salts.

Some materials of these examples are autopolymerizable, so examples were repeated without the catalysts for comparison.

In Examples 1 and 2 without catalysts, the material had evaporated after 1 day, and Example 3 evaporated after 4 days. The materials of Examples 4 and 5 became soft and cheesey after a few days and the material of Example 6 remained as a fluid. Examples 45-52 remained as a fluid after 7½ hours at 90° C.

The terms alkyl, aryl, and alkaryl as used in the practice of the present invention (excluding the definitions of $R_f$ and $R'_f$) also include those simple substitutions recognized as functional equivalents of those groups by the ordinarily skilled artisan in the practice of the present invention (such as $-CH_2CH_2Cl$, $SO_3-\langle\bigcirc\rangle$, $NO_2CH_2CH_2-\langle\bigcirc\rangle$).

It has been found that at least some water must be present for the catalysis to occur, but atmospheric moisture is quite sufficient. Only anhydrous conditions will prevent catalysis.

What is claimed is:

1. A method of curing at least one silane compound of the formula $$X_mSiR_{4-m}$$

wherein
X is a labile group
R is a hydrocarbyl group, and
m is 2, 3, or 4
comprising curing the said at least one silane compound by placing said compound into catalytic proximity with a catalytically active amount of a highly fluorinated aliphatic sulfonyl catalyst having two or three highly fluorinated aliphatic sulfonyl groups attached directly to an imide or methylene group, and water.

2. The method of claim 1 wherein the highly fluorinated aliphatic sulfonylic catalyst is represented by the formula $$(R_fSO_2)-Q-(SO_2R'_f)$$

wherein $R_f$ and $R'_f$ are independently highly fluorinated aliphatic groups, and
Q is selected from $$-NH', \quad -\underset{|}{C}R'R'' \quad \text{and} \quad -\underset{|}{C}=CHR^3$$

wherein R' is selected from hydrogen, chlorine, bromine, iodine, ammonium cation, or metal cation, R'' is selected from hydrogen, chlorine, bromine, iodine, $R_fSO_2$, alkenyl of 3 to 4 carbon atoms, alkyl of 1 to 20 carbon atoms, and alkaryl of up to 20 carbon atoms, $R^3$ is H, alkenyl of 3 to 4 carbon atoms and aryl of up to 20 carbon atoms.

3. The method of claim 2 wherein the silane compound is an epoxy-terminated silane selected from

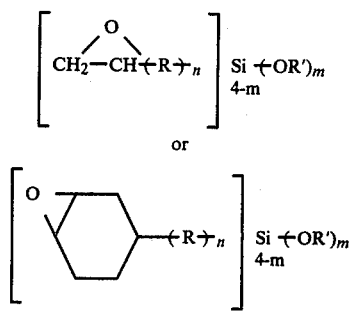

wherein,
each R is independently a divalent hydrocarbon radical of less than 20 carbon atoms, or a divalent radical of less than 20 carbon atoms the backbone of which is C atoms which may be interrupted by individual atoms from the group of N and O, the O atoms in the form of ether linkages,
m is 1, 2, or 3,
n is 0, or 1, and
R' is an aliphatic hydrocarbon radical of less than 10 carbon atoms, acyl radical of less than 10 carbon atoms, or a radical of the formula $(CH_2CH_2O)_kZ$ in which k is an integer of at least 1, and Z is hydrogen or an aliphatic hydrocarbon radical of less than 10 carbon atoms.

4. The method of claim 2 wherein the silane compound is an epoxy-terminated silane selected from

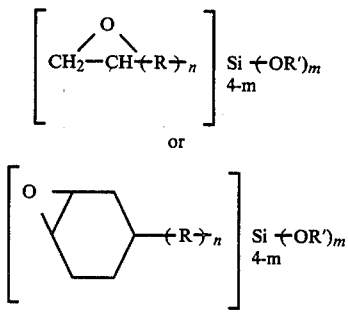

wherein,
each R is independently a divalent hydrocarbon radical of less than 20 carbon atoms, or a divalent radical of less than 20 carbon atoms the backbone of which is C atoms which may be interrupted by individual atoms from the group of N and O, the O atoms in the form of ether linkages,
m is 1, 2, or 3,
n is 0, or 1, and
R' is an aliphatic hydrocarbon radical of less than 10 carbon atoms, acyl radical of less than 10 carbon atoms, or a radical of the formula $(CH_2CH_2O)_kZ$ in which k is an integer of at least 1, and Z is hydrogen or an aliphatic hydrocarbon radical of less than 10 carbon atoms.

5. The method of claim 2 wherein R' is hydrogen, R'' is selected from hydrogen, chlorine, bromine, and iodine, $R_f$ and $R'_f$ are perfluoroalkyl groups, and m is 3 or 4.

6. The method of claim 5 wherein R' are hydrogen, R'' is hydrogen, chlorine, bromine, and iodine, $R_f$ and $R'_f$ are perfluoroalkyl groups, and m is 3 or 4.

7. The method of claim 6 wherein the silane compound is an epoxy-terminated silane selected from

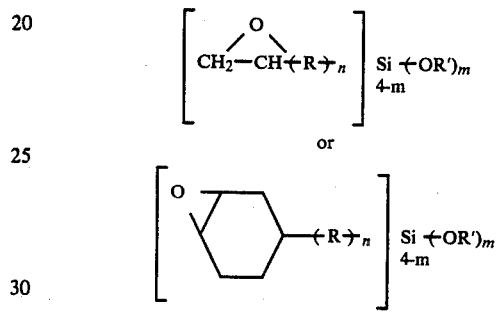

wherein,
each R is independently a divalent hydrocarbon radical of less than 20 carbon atoms, or a divalent radical of less than 20 carbon atoms the backbone of which is C atoms which may be interrupted by individual atoms from the group of N and O, the O atoms in the form of ether linkages,
m is 1, 2, or 3,
n is 0, or 1, and
R' is an aliphatic hydrocarbon radical of less than 10 carbon atoms, acyl radical of less than 10 carbon atoms, or a radical of the formula $(CH_2CH_2O)_kZ$ in which k is an integer of at least 1, and Z is hydrogen or an aliphatic hydrocarbon radical of less than 10 carbon atoms.

8. The method of claim 1 wherein X is selected from hydrogen, halogen, alkoxy, aryloxy or acyloxy and R is selected from aliphatic groups of 1 to 18 carbon atoms and aromatic hydrocarbons of up to 10 carbon atoms.

9. The method of claim 8 wherein the catalyst is of the formula:

wherein
$R_f$ and $R'_f$ are independently a highly fluorinated alkyl group, and
Q is a divalent radical selected from —NH— and —CHR—
wherein R is selected from Br, Cl, I, H, alkyl groups of 1 to 20 carbon atoms, alkenyl of 3 to 4 carbon atoms, aryl or aralkyl of up to 20 carbon atoms, or R'X,
wherein R' is an alkylene group of up to 20 carbon atoms and X is H, Br, Cl, I, $-O_2SR_f$, $-CH(O_2SR_f)_2$, $-\underset{\underset{Br}{|}}{CH}-(CH_2)_n-COOR^4$, or $-CY(COOR^2)_2$ wherein $R^4$ is H or 1 to 8 alkyl and n is 0 to 8, and wherein $R^2$ is alkyl of 1 to 4 carbon atoms or phenylalkyl, the alkyl group of which has 1 to 4 carbon atoms, and Y is H, Br, Cl, I, or $NO_2$.

10. The method of claim 9 wherein the catalyst comprises $R_fSO_2\underset{\underset{C_6H_5}{|}}{CH}SO_2R'_f$ or $R_fSO_2CH_2SO_2R'_f$.

* * * * *

UNITED STATES PATENT AND TRADEMARK OFFICE
CERTIFICATE OF CORRECTION

PATENT NO. : 4,167,617
DATED : September 11, 1979
INVENTOR(S) : Mark W. Siefken

It is certified that error appears in the above-identified patent and that said Letters Patent are hereby corrected as shown below:

Column 8, line 4, delete "g. $C_4F_9SO_2-N-SO_2CF_3$".

Signed and Sealed this

Tenth Day of June 1980

[SEAL]

Attest:

SIDNEY A. DIAMOND

Attesting Officer

Commissioner of Patents and Trademarks